US009580181B2

(12) United States Patent
Figueroa-Karlstroem

(10) Patent No.: US 9,580,181 B2
(45) Date of Patent: Feb. 28, 2017

(54) METHOD AND ARRANGEMENT FOR DE-ICING A STRUCTURAL ELEMENT

(75) Inventor: Eduardo Figueroa-Karlstroem, Skaerholmen (SE)

(73) Assignee: SAAB AB, Linkoeping (SE)

( * ) Notice: Subject to any disclaimer, the term of this patent is extended or adjusted under 35 U.S.C. 154(b) by 340 days.

(21) Appl. No.: 13/876,800

(22) PCT Filed: Sep. 28, 2010
(Under 37 CFR 1.47)

(86) PCT No.: PCT/SE2010/051041
§ 371 (c)(1),
(2), (4) Date: Dec. 16, 2013

(87) PCT Pub. No.: WO2012/044213
PCT Pub. Date: Apr. 5, 2012

(65) Prior Publication Data
US 2014/0191082 A1    Jul. 10, 2014

(51) Int. Cl.
*B64D 15/16* (2006.01)
*H02N 1/00* (2006.01)

(52) U.S. Cl.
CPC .......... *B64D 15/163* (2013.01); *F03D 80/40* (2016.05); *H02N 1/002* (2013.01); *Y02E 10/721* (2013.01); *Y02E 10/722* (2013.01)

(58) Field of Classification Search
None
See application file for complete search history.

(56) References Cited

U.S. PATENT DOCUMENTS 3,046,537 A * 7/1962 Dow ............................. 340/580
3,549,964 A * 12/1970 Afanasov ............. B64D 15/163
244/134 A (Continued)

FOREIGN PATENT DOCUMENTS

CN    1497133 A    5/2004
CN    101590914 A    12/2009
(Continued)

OTHER PUBLICATIONS

State Intellectual Property Office of the P.R.C., Search Report for Application No. 2010800692981, Nov. 20, 2014, 2 pages, China.
(Continued)

*Primary Examiner* — Medhat Badawi
(74) *Attorney, Agent, or Firm* — Alston & Bird LLP

(57) ABSTRACT

The present invention relates to a de-icing arrangement for de-icing a structural element {170; 270; 370}. The structural element could be made of a whole polymeric or metallic material. The arrangement comprises a power source (250) being electrically connected to an electrode configuration (200), said power source is arranged to, when applicable, electrically charge said electrode configuration (200). The electrode configuration (200) is arranged to generate an impulsive force (Fn) for removal of ice adhered on said structural element (170; 270; 370). The invention relates to a method for de-icing a structural element. The invention also relates to a computer program and a computer program product. The invention also relates to a platform carrying the arrangement.

19 Claims, 4 Drawing Sheets

(56) References Cited

U.S. PATENT DOCUMENTS

| | | | | |
|---|---|---|---|---|
| 3,672,610 A * | 6/1972 | Levin | .................... | B06B 1/023 |
| | | | | 244/134 R |
| 3,684,953 A * | 8/1972 | Grant | .................. | G01N 27/223 |
| | | | | 324/608 |
| 3,809,341 A * | 5/1974 | Levin et al. | .............. | 244/134 R |
| 3,873,927 A * | 3/1975 | Overall | .................. | G01W 1/00 |
| | | | | 307/116 |
| 4,458,865 A * | 7/1984 | Sandorff | ............. | B64D 15/163 |
| | | | | 244/134 R |
| 4,629,149 A * | 12/1986 | Carson et al. | ............ | 244/134 R |
| 4,678,144 A * | 7/1987 | Goehner et al. | .......... | 244/134 R |
| 4,690,353 A * | 9/1987 | Haslim et al. | ............ | 244/134 D |
| 4,875,644 A * | 10/1989 | Adams et al. | ............ | 244/134 R |
| 4,894,569 A * | 1/1990 | Lardiere et al. | ................ | 310/10 |
| 4,895,322 A * | 1/1990 | Zieve | ................... | B64D 15/163 |
| | | | | 244/134 D |
| 4,982,121 A * | 1/1991 | Lardiere et al. | ................ | 310/10 |
| 5,022,612 A * | 6/1991 | Berson | ..................... | 244/134 D |
| 5,067,903 A * | 11/1991 | Szyszkowski | .................. | 439/55 |
| 5,074,497 A * | 12/1991 | Phillips, II | ................. | 244/134 D |
| 5,129,598 A | 7/1992 | Adams et al. | | |
| 5,143,325 A * | 9/1992 | Zieve et al. | .............. | 244/134 D |
| 5,152,480 A * | 10/1992 | Adams et al. | ............ | 244/134 D |
| 5,248,116 A * | 9/1993 | Rauckhorst | ............... | 244/134 A |
| 5,272,400 A * | 12/1993 | Goldberg et al. | ............... | 310/10 |
| 5,314,145 A * | 5/1994 | Rauckhorst, III | ........ | 244/134 A |
| 5,326,051 A * | 7/1994 | Pisarski | .................... | 244/134 D |
| 5,346,160 A * | 9/1994 | Pisarski | .................... | 244/134 R |
| 5,361,183 A * | 11/1994 | Wiese | ............................. | 361/42 |
| 5,427,332 A * | 6/1995 | Rauckhorst et al. | ..... | 244/134 A |
| 5,429,327 A * | 7/1995 | Adams | ...................... | 244/134 D |
| 5,544,845 A * | 8/1996 | Giamati et al. | ........... | 244/134 E |
| 5,547,150 A * | 8/1996 | Adams et al. | ............ | 244/134 R |
| 5,553,814 A * | 9/1996 | Rauckhorst et al. | ..... | 244/134 A |
| 5,553,815 A * | 9/1996 | Adams | ................ | B64D 15/163 |
| | | | | 244/134 R |
| 5,584,450 A * | 12/1996 | Pisarski | .................... | 244/134 D |
| 5,609,314 A * | 3/1997 | Rauckhorst et al. | ..... | 244/134 A |
| 5,657,952 A * | 8/1997 | Goldberg | .................. | 244/134 R |
| 5,904,322 A * | 5/1999 | Giamati et al. | ........... | 244/134 B |
| 5,934,617 A * | 8/1999 | Rutherford | ............... | 244/134 E |
| 6,102,333 A | 8/2000 | Gerardi et al. | | |
| 6,129,314 A * | 10/2000 | Giamati et al. | ........... | 244/134 R |
| 6,145,787 A * | 11/2000 | Rolls | .......................... | 244/134 R |
| 6,725,645 B1 * | 4/2004 | Wadia et al. | ................. | 60/226.1 |
| 6,870,139 B2 * | 3/2005 | Petrenko | .................. | A63C 1/30 |
| | | | | 219/201 |
| 8,344,323 B1 * | 1/2013 | Hartley | ................ | A61B 5/1455 |
| | | | | 250/338.1 |
| 2004/0206854 A1 * | 10/2004 | Shah | ...................... | B64D 15/20 |
| | | | | 244/144 |
| 2009/0230239 A1 * | 9/2009 | Stothers | .......................... | 244/58 |
| 2010/0155538 A1 * | 6/2010 | Calder et al. | .............. | 244/134 D |
| 2010/0206990 A1 * | 8/2010 | Petrenko | .............. | B64D 15/163 |
| | | | | 244/134 D |
| 2010/0243811 A1 * | 9/2010 | Stothers | .................... | 244/134 R |
| 2013/0228653 A1 * | 9/2013 | Breer et al. | ................ | 244/134 D |
| 2014/0070054 A1 * | 3/2014 | Burton et al. | ............ | 244/134 D |
| 2014/0191082 A1 * | 7/2014 | Figueroa-Karlstrom | . | 244/134 A |
| 2015/0129720 A1 * | 5/2015 | Strobl et al. | .............. | 244/134 D |

FOREIGN PATENT DOCUMENTS

| | | |
|---|---|---|
| EP | 0067506 A1 | 12/1982 |
| EP | 0428011 A2 | 5/1991 |
| GB | 2106966 A | 4/1983 |

OTHER PUBLICATIONS

International Searching Authority, International Search Report for International Application No. PCT/SE2010/051041, mailed Jun. 8, 2011, 5 pages, Swedish Patent and Registration Office, Sweden.
International Preliminary Examining Authority, International Preliminary Report on Patentability for International Application No. PCT/SE2010/051041, including Applicant's Jul. 19, 2012 Response to the Jun. 8, 2011 Written Opinion, mailed Sep. 17, 2012, 11 pages, Swedish Patent and Registration Office, Sweden.

\* cited by examiner

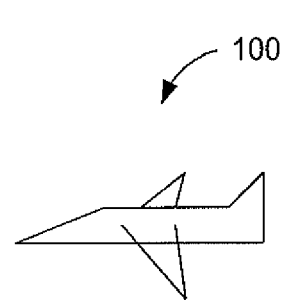
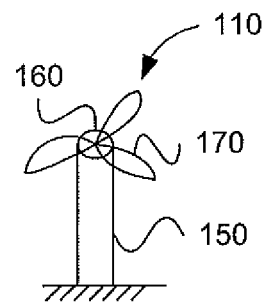
Fig. 1a    Fig. 1b
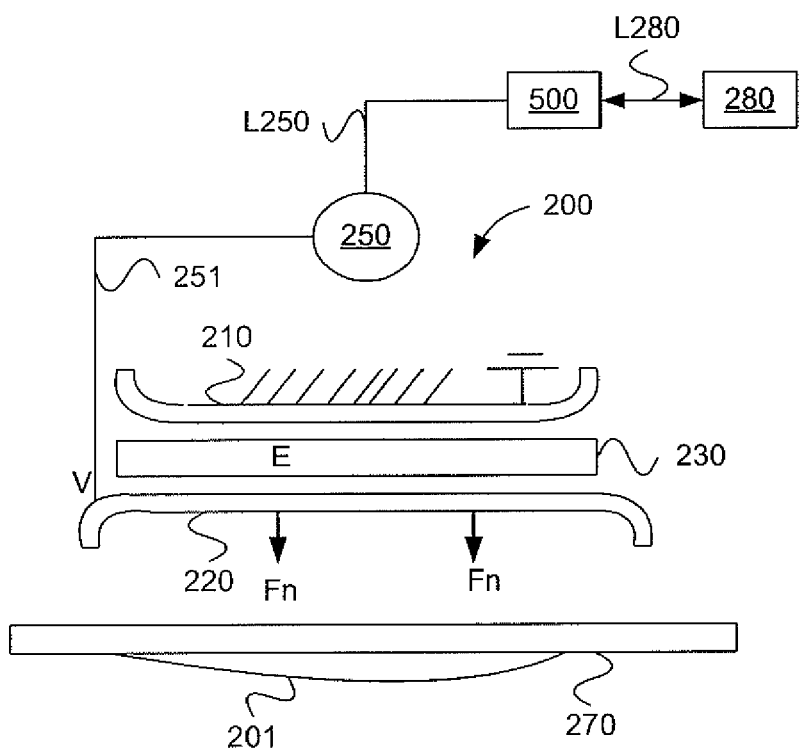
Fig. 2

METHOD AND ARRANGEMENT FOR DE-ICING A STRUCTURAL ELEMENT

CROSS REFERENCE TO RELATED APPLICATIONS

This application is a national stage application, filed under 35 U.S.C. §371, of International Application No. PCT/SE2010/051041, filed Sep. 28, 2010, the contents of which are hereby incorporated by reference in its entirety.

BACKGROUND OF THE INVENTION

Related Field

The present invention relates to an arrangement and method for de-icing a structure. In particular the invention relates to an arrangement and method for de-icing a whole polymeric (fiber reinforced) or metallic wing or propeller. The invention also relates to a computer programme and a computer programme product. The invention also relates to a platform carrying the arrangement.

Description of Related Art

Aircrafts are continuously exposed to varying climatic condition and among the extremes situation is ice accretion one of the most threatening events. Ice accretion is known to cause serious perturbation to the flying conditions due to ice formations in aerodynamic surfaces of aircraft.

Ice accretion on aircrafts is a very complex physical process. The selection of an adequate ice rejection technique is thus a difficult task. The technique to be selected must be made compatible with a number of constrains comprising materials properties, fatigue, dynamic deformation while in flight, birds collision withstanding ability, repairing and servicing constrains, durability, etc. just to name a few. Therefore, any method to be considered has to be carefully analyzed in its total context to end up with technical conclusions of value.

One of the issues now upcoming is to be found on the growing need of fuel consumption reductions which in turn impose requirements of weight reduction and exceptional aerodynamic constrains, especially laminar air flow. This has been leading to the development of the Smart Fix-wings Aircraft concept where the wings are thought to be made of light weight fiber reinforced epoxy. The removal of ice can be accomplished either by providing melting heat or mechanical stresses to the skin just to surpass adhesion forces of the accreted ice layer. Heat however is known to demand too much power, and in the case of epoxy based material, high temperature is an ageing factor that should be avoided. Mechanical stresses on the other hand should be impulsive to minimize the energy consumption and to accomplish ice cracking while destroying the ice surface adhesion. The accreted ice will then be removed mainly due to the drag forces of the air. Therefore, actuators able to accomplish wing skin surface displacements through the action of impulsive forces are highly interesting.

U.S. Pat. No. 5,584,450 depicts an electro-expulsive de-icing system for attachment to an airfoil which is comprised of a plurality of electro-expulsive elements separated by a dielectric filler regions all of which are disposed between a top dielectric layer and a bottom dielectric layer. A contiguous top skin layer covers the entire de-icing apparatus.

U.S. Pat. No. 5,129,598 depicts an attachable electro-impulse de-icer for de-icing an aircraft structural member including an inductor coil disposed in proximity with the outer surface of the structural member. The coil is supported by a flexible ice-accumulating support member that permits the coil to move relative to the structural member. The coil and the support member may be formed in an integral construction that can be attached to the leading edge of the structural member. The coil and the support member are rapidly displaced away from the structural member upon passing a short-duration, high current pulse through the coil.

Known ice rejection methods are mostly conceived for metallic skin materials and are mostly inductive or thermal (heating). There are even methods that accomplish deicing through total deformation (inflatable layers, etc.).

Known drawbacks of some of the methods are related to the fact that those ice rejection devices introduce significant local perturbation to air flow. Since laminar flow, particularly at wing surfaces, is a much wanted feature from the view point of aerodynamic considerations, any protrusion to the surfaces is not acceptable.

Another drawback of known deicing methods is to be found in the melting of the interlayer of ice and wings which may lead to a gliding effect of the accreted ice pushing it back of simply generating water that flows back and risk to be frozen at the ailerons of aircraft wings.

BRIEF SUMMARY

There is an object of the invention to provide an improved method and arrangement for de-icing a structural element, such as a wing of an aircraft or a propeller blade of a wind power installation.

There is another object to provide a robust method and arrangement for de-icing a structural element, such as a wing of an aircraft or a propeller blade of a wind power installation.

There is also an object of the invention to provide an alternative method and arrangement for de-icing a structural element, such as a wing of an aircraft or a propeller blade of a wind power installation.

Yet another object of the invention is to provide a method and arrangement for improving performance of a platform exposed to harsh weather conditions giving rise to ice accretion.

Still yet another object of the invention is to provide a method and arrangement for reducing a risk of unwanted air turbulence at a platform, which air turbulence results in impaired performance thereof.

These objects are achieved by a de-icing arrangement according to claim 1. According to an aspect of the invention there is provided a de-icing arrangement for de-icing a structural element, comprising:
a power source being electrically connected to an electrode configuration, said power source is arranged to, when applicable, electrically charge said electrode configuration, wherein said electrode configuration is arranged to generate an impulsive force for removal of ice adhered on said structural element.

Said electrode configuration may comprise a first electrode and a second electrode being mutually displaceable, wherein one of said first and second electrode being closest to the ice to be removed. The other one of said first and second electrode being fixed to said structural element.

Said power source may be arranged to, when applicable, electrically charge said electrode configuration to a predetermined state.

Said electrode configuration is arranged to generate an impulsive force for removal of ice adhered on said structural element when charging to and dis-charging from said predetermined state. Said charging and dis-charging of said electrode configuration is performed pulse like, i.e. with a short duration, such as 1-5 milliseconds. This pulse is creating an impulsive force which is acting on said structural element so as to remove said adhered ice.

By providing a voltage pulse to said electrode arrangement an electrical field is quickly built up between the first electrode and the second electrode. During discharge of said electrode arrangement energy associated with said electrical field is at least party transformed to an impulsive force which impacts said structural element, resulting in an impulse like deformation of a skin of said structural element. Hereby ice adhered to said structural element may be removed.

A cracking effect on accreted ice is aimed to reduce the size of ice blocks removed from front wings of an aircraft to avoid flying ice pieces that could damage other parts of the aircraft while flying backwards.

Said predetermined state of said electrode configuration may be an arbitrary suitable state, where said electrical field between said first electrode and second electrode is large enough to remove a detected and measured ice layer on said structural element. This means that said predetermined state may be determined on the basis of a thickness and configuration measured by an ice detecting/measuring system as depicted below.

The basic advantages of the invention are to be found in the simplicity of the concept. The arrangement is simple to implement in existing platforms. It also provides a low level of intrusion in the structural element of e.g. a whole composite wing for aircraft.

There is however a wide spectrum of potential applications for the de-icing concept hereby submitted, both military and civilian.

The mayor advantage of the de-icing concept is to be found in the fact that the technique can equally be implemented in whole polymeric or metallic wings, although the solution should be adapted carefully to each case to ensure functionality and correct use of electricity.

The energy amount expected to be demanded by the operation of de-icing arrangement is very low as it will be intermittent in pulses and proportional to $V^2$, where V is a voltage of over the first electrode and the second electrode, before dis-charge. Furthermore, it must be mentioned that the impulsive forces, e.g. tabulated in the section "Principles of the invention" below, will be much more enhanced than those given in the second force column if a typical polyester film is used. Actually the impulsive forces may increase by a factor about 40-50, or higher, depending upon dielectric properties. A gap between the first electrode and the second electrode not greater that 0.5 mm will be needed, which can be an advantage in many aerodynamic aspects. It should be evident that the gap, its length and the thickness of the skin of the structural element as well as the maximum attainable impulsive forces should be coordinated to be within the limits of de-lamination of the chosen composite. The impulsive forces have to be decided on the basis of what is needed to accomplished, while still coordinated with material properties and withstanding ability. In practice, there is needed a design involving a compromise between material properties of the arrangement and how the chosen material will work during a long life time.

An advantage relating to mechanical stresses is to be found in the fact that the concept according to an aspect of the invention is very compact and therefore will not be particularly affected by impacts with e.g. birds or other potential objects in the air which may impact on the wings (debris, stones etc.).

For aircrafts, an ice thickness above about 3-4 mm will create a too significant deterioration of aerodynamic behavior and therefore ice rejection should in general not be allowed for too much ice accretion. A too thin layer of ice, say below 1 mm is too much elastic and will therefore follow the induced oscillations (provided by repeated generation of impulsive forces) in a skin of the structural element too easily. On the other side, a too heavy ice accumulation means a large thickness of accreted ice and therefore the forces needed to accomplish mechanical deformation of the skin of the structural element will grow to limits closer to those that might cause damage to the say composite skin of the wings. Therefore it is very much needed to carefully evaluate the optimal range of operation of such a device to ensure performance and no-risk of operation against the possibility of structural damages to composites or metallic skins. This is however a possible to accomplish through a careful experimental work and design of the power system to activate de-icing.

A too low accreted ice layer thickness, say below 0.5-0.7 mm is a very elastic layer of ice whereby the deformation induced in the skin by impulsive forces is in general not able to accomplish ice-rejection. On the other side, a too thick layer of ice will increase the mass of the skin in such a way that the impulsive forces may not able to accomplish a displacement of the skin with a deformation level enough to cracks the accreted ice and thereby induce rejection. Careful thickness measurement of accreted thicknesses is thus mandatory for correct implementation of ice rejection strategies.

Advantageously the arrangement can be installed in carbon or glass fiber reinforced polymers (structural element). Cables for communication between devices within the de-icing arrangement, power cables as well as the electrode configuration may be integrated in a whole plastic structural device. In a case of whole metallic wings, there are methods of implementing a secure solution with advanced methods of coordinated insulation.

Said electrode configuration may comprise a first electrode and a second electrode being provided in a close proximity of each other.

Said electrode configuration may comprise a first electrode and a second electrode being mutually displaceable, wherein one of said first and second electrode is closest to the ice to be removed, and wherein the other one of said first and second electrode is fixed to said structural element.

Said electrode configuration may comprise a sandwiched dielectric element. Said dielectric element may be very thin. According to one example said dielectric element is about 250 micrometer thick. Hereby a larger impulsive force may be generated for a given voltage.

Said electrode configuration may comprise a plate capacitor. A plate capacitor is in general a rather cheap device. The arrangement therefore provides for a cost effective solution of the above stated problems.

Said first and second electrodes may be strip like. The ice rejection method hereby proposed is intrinsically flat and not protruding, has very low thickness and thereby does not affect neither the aerodynamics of a surface of the structural element nor the structural intrusion on composites wings or metallic wings of a platform. Those are otherwise common drawbacks of known de-icing methods.

Said first electrode may comprise a plurality of separated first electrodes, and wherein said second electrode is functionally provided at each of said plurality of separated first electrodes. By providing generation of said impulsive forces at predetermined distinct locations along said second electrode, such as at locations where ice accretion is a known problem, less material for manufacturing the first electrode is required. A cheaper de-icing arrangement is thus provided, without delimiting performance of said arrangement. Naturally, according to another embodiment, said second electrode may comprise a plurality of separated second electrodes, and said first electrode may be functionally provided at each of said plurality of separated second electrodes.

It should be noted that in the electrode configuration hereby suggested, according to an example, one of the electrodes should be an integral part of a movable skin, while the other electrode is attached to wing structural beams so as to accomplish a fix part relative to the movable one.

One possible advantage of this concept in a whole polymeric wing is to be found in the fact that one of the electrodes, e.g. the one attached to the wing structural beams, could be made continuous over the whole extension of the structural element and dimensioned to allow for high current densities, whereby its functionality could be extended using it as a lightning diverting path, wherein this electrode should be earthed.

Said generated impulsive force may have an amplitude sufficient for removal of an adhered layer of ice having a thickness of about 1-3 millimeter ($10^{-3}$ m). Said generated impulsive force may alternatively have an amplitude sufficient for removal of an adhered layer of ice having a thickness of about 1-10 millimeter ($10^{-3}$ m). The applied voltage to the electrode configuration, as well as dimensions and characteristics of said first electrode, second electrode and said dielectric element should be chosen so as to achieve a suitable impulsive force for removing ice adhered to said structural element.

Said arrangement is arranged to generate a number of successive impulsive forces for removal of ice adhered on said structural element. Hereby an effective de-icing arrangement is provided. According to one embodiment there is generated a predetermined number of chock pulses for removing the ice on the structural element. According to one example 3-5 successive chock pulses are generated by means of said electrode configuration. According to another example more than 5 successive chock pulses are generated.

A technical implementation of high voltage pulses generation could be seen as a similar solution as the one encountered in spark generation for automobiles, where voltage pulses of 10-15 kV are commonly used. The number of pulses and their shape could be adjusted electronically at the primary side of a HV coil by a microprocessor controlled device. The phase shift of a coil transformer has to be considered if positive or negative pulses are wanted. The key issue here is that the noise band of the pulses can be controlled and, for the specific application a noise band below or at most 1 MHz is expected for pulses with rice and fall in the range of milliseconds.

Each pulse may have an arbitrarily suitable duration. According to one example a pulse has a duration of 1 millisecond. The impulsive force for removing ice on the structural element is operating substantially during the generated voltage power pulse.

According to one aspect of the invention there is determined a need to generate an impulsive force for removing ice on the structural element before said impulsive force is generated. A need to generate an impulsive force for removing ice on the structural element may be determined by a means to determine ice thickness on said structural element. This means to determine ice thickness on said structural element may be provided adjacent to said de-icing arrangement.

The de-icing arrangement may comprise at least two electrode configurations. The at least two electrode configurations may be powered by one single power source, such as a battery or a main power source aboard an aircraft. Alternatively, the at least two electrode configurations may be powered by different power sources, such as a main power source and an auxiliary power source aboard an aircraft, respectively. It should also be noted that the at least two electrode configurations may be operationally driven by means of one or more control units for controlling generation of said impulsive forces and, when applicable, de-ice said structural element according to an aspect of the invention.

Said two electrode configurations may be generating said impulsive forces in an alternating way. Said electrode configurations do not need to be synchronized to generate oscillation in a skin of the structural element to achieve ice rejection. According to another example, said two electrode configurations may be generating said impulsive forces substantially simultaneously.

Said voltage power source may create an electric field between said first electrode and said second electrode, which field has an arbitrarily suitable magnitude, such as 1 kV, 5 kV or 10 kV. Alternatively, the electric field may have an amplitude which is lower than 1 kV or more than 10 kV.

Said structural element may be made of a non-metallic material, such as a full-plastic material, comprising e.g. carbon-fibre and/or glass-fibre. Said structural element may be made of a metallic material, such as Alumina, or light weight metallic alloys. According to one example, said structural element may be made of a metallic material and whole plastic material.

Said structural element may be part of any other application demanding controlled ice accretion on its surface with periodical ice rejection as it can be accomplished with a tailored application of this ice ejection concept.

Said structural element may be a wing of an aircraft. Said structural element may be a skin of a wing of an aircraft. Said structural element may be a propeller blade of a wind power installation.

The de-icing arrangement has a very low volume, compared to a prior art solution using coils for removing ice on said structural element. The de-icing arrangement may advantageously also preserve a smooth surface of the structural element, which is highly desirable seen from an air turbulence point of view.

According to an aspect of the invention there is provided a platform comprising the de-icing arrangement depicted herein.

Said platform may be a stationary facility.

Said platform may be a stationary wind power installation or an off shore wind power installation. The concept according to the invention could easily be implemented in the blades of a wind power generator at high latitudes. For instance, in a wind power market perspective the proposed de-icing invention will significantly increase the profitability of wind energy in icing climates. The invention will facilitate the wind power expansion in arctic areas. At present, the absence of effective deicing methods reduces the energy production causing significant economic losses. Furthermore, a huge potential area suitable for generation of electricity as due to their excellent wind conditions in arctic areas is avoided as no adequate de-icing technology is available. Similar arguments could be provided for many other potential application of efficient and compatible deicing technology.

The platform may be an aircraft and said structural element may be an aircraft wing or aircraft rudder. The technology depicted herein may be of easy adaptation to many other civilian and military applications. A person skilled in the art realizes that the technique depicted herein, according to the invention, is applicable to any other application where there exists a basic need of ice rejection of a structural element.

According to an aspect of the invention there is provided a method for de-icing a structural element, comprising the step of:
when applicable, electrically charging an electrode configuration by means of a power source, which is electrically connected to said electrode configuration, and the step of:
generating an impulsive force for removal of ice adhered on said structural element.

According to an aspect of the invention there is provided a rapid change in voltage delivered to the electrode configuration.

In case of an aircraft platform, the de-icing method may be performed before take-off, during take-off, in flight, and/or during landing, i.e. in any case where ice has been detected on one or more wings of the aircraft.

The method may further comprise the step of:
activating said electrically charging of said electrode configuration on the basis of a signal indicating presence of a current ice state on said structural element.
The method may further comprise the step of:
determining whether said electrically charging of said electrode configuration has set said electrode configuration in said predetermined state.
The method may further comprise the step of:
determining a state of ice built up on said structural element, and generating said impulsive force on the basis on said determined state.

BRIEF DESCRIPTION OF THE FIGURES

For a more complete understanding of the present invention and further objects and advantages thereof, reference is now made to the examples shown in the accompanying drawings, wherein like reference characters refer to like parts throughout the several views, and in which:

FIG. 1a schematically illustrates a platform in the form of an aircraft, according to an aspect of the present invention;

FIG. 1b schematically illustrates platform in the form of a wind power installation, according to an aspect of the present invention;

FIG. 2 schematically illustrates a de-icing arrangement, according to an aspect of the present invention;

DETAILED DESCRIPTION OF THE INVENTION

Figure 3A:
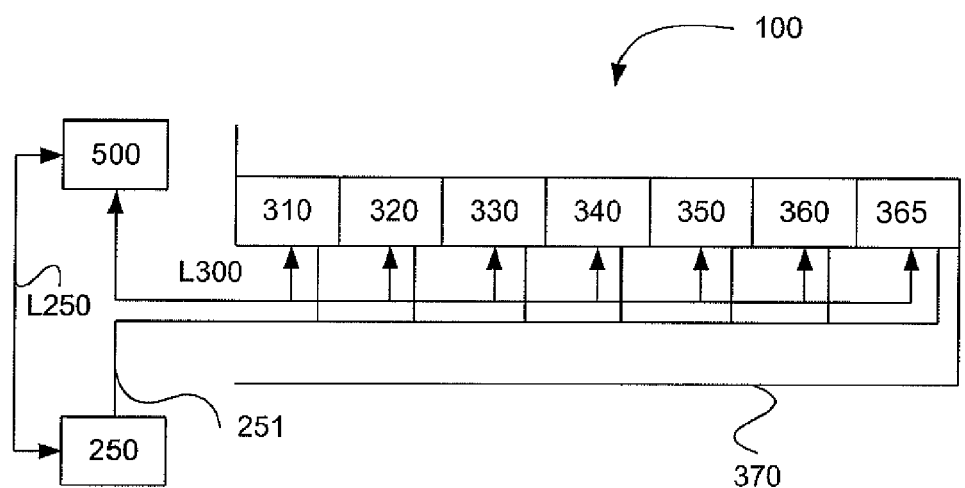
FIG. 3a schematically illustrates a wing of an aircraft being provided with, a plurality of de-icing arrangements, according to an aspect of the present invention.

With reference to FIG. 1a there is depicted a platform 100 according to an aspect of the invention. According to FIG. 1a the platform 100 is exemplified by an aircraft. The aircraft may be a fighter, bomber, surveillance aircraft, or a combination thereof. The aircraft may be a commercial civilian aircraft, such as an airliner, or utility aircraft. The aircraft may be engine powered or a glider. The aircraft may be manned or unmanned, e.g. an UAV (Unmanned Aerial Vehicle). The aircraft may be fixed-wing, ornithopter, rotary wing or a combination thereof. The platform 100 may alternatively be a satellite, space-shuttle, rocket or missile.

According to other examples where the arrangement may be implemented, the platform may be a watercraft, such as a ship, boat or ferry. The arrangement may be installed on an oil rig, or other floating platform. In particular the arrangement is suitable for installation on a floating wind power installation.

With reference to FIG. 1b there is schematically depicted a platform, which is suitable for an arrangement for de-icing a structure, according to an aspect of the invention.

According to FIG. 1b the platform 100 is a stationary facility. According to a preferred embodiment the stationary facility is a wind power installation for generating electrical power in a conventional manner. According to this example the wind power installation comprises a base structure 150, a hub 160 and three propeller blades 170. Other features, such as generator, gear box and control units are not shown in FIG. 1b, for reasons of clarity. A rotor diameter of said wind power installation may be up to 120 meters, however any suitable rotor diameter may be used, such as 50 meters or 75 meters. The wind power installation may be adapted for low, medium or high wind. According to one example the wind power installation is provided with three propeller blades, however, any suitable number of propeller blades may be suitable.

Wind power installations may suffer from ice accretion on e.g. the propeller blades 170. Ice accreted on the propeller blades, in general, has a negative impact on the performance of the wind power installation 110. Generated electrical power may be reduced by as much as 40%, or even more in extreme icing conditions, as compared to operation during more favourable weather conditions, i.e. conditions implying acceptable or zero ice accreted on the propeller blades 170.

In a situation where adhered ice is covering at least a part of one propeller blade, shear forces at the hub 160 of the propeller blades causes impaired operation and an increased risk for shut down or, in severe cases, a breakdown of the wind power installation 110.

An arrangement depicted with reference to FIG. 2 is according to an embodiment of the invention integrated in at least one propeller blade, preferably all propeller blades of the wind power installation.

Alternatively, a suitable stationary facility (platform) may be any chosen from a group comprising: wireless communication installations, such as antennas carrying radio base stations for cell phone communication, parabolas arranged on support structures, radar stations, any civil and/or military device or systems where ice accretion on its surface impairs a desired functionality, thereof, etc.

With reference to FIG. 2 there is schematically illustrated an example configuration of an arrangement for de-icing a structural element, according to an aspect of the invention.

The de-icing arrangement comprises an electrode configuration 200. In more detail, the de-icing arrangement comprises a first electrode 210 and a second electrode 220. A dielectric element 230 is interposed between said first electrode 210 and said second electrode 220.

One of the electrodes (electrode 210) of the electrode configuration is fixed while the other electrode (electrode 220) is made movable with the skin of the system. Mechanical design precautions have to be undertaken so as to allow the de-icing arrangement to accomplish oscillations in the range of about 1 mm in amplitude without damaging to the skin (for instance de-lamination, fatigue, etc.). Furthermore, the bouncing back of the electrode once rejected must also be considered and damped to avoid mechanical damages.

According to one example, the de-icing arrangement comprises a plate capacitor. In more detail the de-icing arrangement comprises a first capacitor plate 210 and a second capacitor plate 220. The plate capacitor is according to one aspect of the invention a parallel plate capacitor.

The first electrode 210 may be made of any suitable material, which is a material being compatible with the structural element, second electrode 220 and the dielectric element 230, where the de-icing arrangement employed. The first electrode 210 may be made of any suitable metal or alloy. Also, the first electrode 210 may have any suitable dimensions. However, according to a preferred embodiment the first electrode 210 is substantially two-dimensional, i.e. in a shape of a sheet, e.g. having a rectangular shape. According to one example the first electrode 210 is strip like. The first electrode 210 may be integrated in the structural element.

The second electrode 220 may be made of any suitable material, which is a material being compatible with the structural element, first electrode 210 and the dielectric element 230, where the de-icing arrangement employed. The second electrode 220 may be made of any suitable metal or alloy. Also, the second electrode 220 may have any suitable dimensions. However, according to a preferred embodiment the second electrode 220 is substantially two-dimensional, i.e. in a shape of a sheet, e.g. having a rectangular shape. According to one example the second electrode 220 is strip like. The second electrode 220 may be integrated in the structural element.

A width of the first electrode is in one example in the range of 3-8 cm or more. The width of the second electrode is in one example in the range of 1-4 cm. The length of the movable electrode (electrode 220) would according to an example be in the case of aircraft applications of a suitable fraction length of a slat, i.e. roughly in the range of 20-60 cm. The fixed electrode (electrode 210) may however be of the whole length of a slat. Several movable electrodes could use different fractions of the fixed electrode. A key issue is to select lengths of the movable electrode that will generate a suitable and optimized pattern of oscillations of the skin of the wings (structural element) as needed to accomplish ice rejection.

There is a gap provided between the first electrode 210 and the second electrode 220. In the gap there is provided the dielectric element 230. The gap may have any suitable dimension. The dielectric element 230 closely fit in the gap, and thus substantially fills the gap between the first electrode 210 and the second electrode 220.

The dielectric element 230 may be made of any suitable material, which is a material being compatible with the structural element, first electrode 210 and the second electrode 220, where the de-icing arrangement employed. The dielectric element 230 may be made of any suitable material, which is a material having suitable mechanical provisions for allowing a desired oscillation pattern of the electrode configuration. According to one example the dielectric element has a inherent characteristic giving the dielectric element a relative permittivity of about 3-4, or higher. It should also have a breakdown withstanding ability higher than the highest dimensioned voltage of applied pulses and, where applicable, a margin of safety e.g. within an interval 30-50%. However any suitable material having a suitable relative permittivity may be used. Also, the dielectric element 230 may have any suitable dimensions. However, according to a preferred embodiment the dielectric element 230 is substantially two-dimensional, i.e. in a shape of a sheet, e.g. having a rectangular shape. According to one example the dielectric element 230 is strip like. The second electrode 210 may be integrated in the structural element closely fitted between the first electrode 210 and the second electrode 220.

The dielectric element 230 may have any shape providing that its surface extension is extended in all directions of the surface between electrodes. The dielectric element 230 must cover and extend above the largest one of the first and second electrodes. i.e., say the larger electrode has a surface of 5×60 cm; then a suitable surface of the dielectric element should have a dimension of about 10×70 cm. The construction demands that the foil should be in place through the working life time of the device.

According to this example, the second electrode 220 is integrated in a movable skin of the structural element 270 where ice accretion results in adhered ice 201. The second electrode 220 is connected to the high voltage pulse source 250 via a cable 251 and is significant smaller in dimension (width), as compared to the fixed, non movable electrode 210, which is earthed and significantly wider than the movable electrode 220. According to one example, the second electrode 220 is ⅓ of the width of the first electrode 210, while the dielectric element 230 is about twice the width of the fixed electrode 210 extending equally both sides symmetrically.

The thickness of the first and second electrodes according to an example does not need to be larger than a fraction of a mm. The dielectric element 330, could be typically of about 250-300 μm. The width of the first and second electrode could typically be in the range 1-4 mm. The length of said first and second electrode would according to an example be of at least the central ⅓ of a slat of an aircraft wing, i.e. roughly about 40-60 cm.

A voltage power source 250 is electrically connected to the movable second electrode 220 via a cable 251. The voltage power source 250 may be a high voltage power source, arranged to provide voltages in a range 10-30 kV (10 kilo Volts-30 kilo Volts). The arrangement 200 as in FIG. 2 is also referred to as transducer and will be supplied with voltage pulses. The voltage power source 250 may be a voltage pulse source. The voltage power source 250 is arranged to charge the electrode configuration 200. The voltage power source 250 is arranged to charge the electrode configuration 200, when suitable, i.e. in a case where there is decided that ice adhered to the structural element should be removed.

According to the example arrangement shown in FIG. 2, the first electrode is provided at ground (zero, 0) voltage. The second electrode 220 is in a charged state at a voltage V, determined by a control unit 500 connected to the voltage power source 250 via a link L250. The control unit 500 is depicted in greater detail with reference to FIG. 5 below. The control unit 500 is also referred to as computer. The voltage V may be of a positive or negative sign, e.g. +10000V, or −10000V.

An ice detecting/measuring system 280 is arranged for communication with the control unit 500 via a communication link L280. The ice detecting/measuring system 280 is arranged to detect if there is any ice adhered to the structural element. The ice detecting/measuring system 280 is also arranged to measure a thickness of detected ice. The ice detecting/measuring system 280 is also arranged to, when suitable, send a signal comprising relevant information to said control unit. The signal may comprise information about that ice has been detected and also a value representing a thickness of said detected ice on the structural element.

The control unit 500 is arranged to receive signals from the detection/measuring system 280. The control unit 500 is arranged to control operation of said electrode configuration on basis of said received signals and/or stored programme routines. In other words, the control unit 500 is arranged to control a de-icing procedure using said voltage power source 250 so as to generate impulsive forces Fn of the first electrode 210 and/or the second electrode 220.

It should be noted that an operator or said platform, e.g. aircraft (pilot) or wind power installation (maintenance staff) may manually activate a de-icing procedure according to an aspect of the invention. This could be done by use of actuating means, such as a key board or push button, being signaling connected to said control unit 500.

Possible problems with the arrangement 200, concerning e.g. use of high voltage and the implicit risk of corona inception, partial discharges, ageing and alike, can be prevented with intelligent solutions, proper design and correct materials selection. The design of the first electrode 210 and second electrode 220 depicted above is such an example.

As depicted herein an the energy W stored in the electric field E generated between the first electrode 210 and the second electrode 220 is supporting the generation of an impulsive force Fn (a force being orientated normal to the surface of the electrodes) so as to create a shock pulse for cracking and thereby removing ice 201 adhered on the structural element.

The force Fn is schematically illustrated in FIG. 2 and, when generated, affects a skin 270 of the structural element. Fn has a direction normal to a plane of the first electrode 210. Fn has a direction normal to a plane of the second electrode 220.

The first electrode 210 is fixed to the bulk of the structural element, while the second electrode 220 is integrated in the movable skin. The dielectric element 230 may be integrated in either the first electrode 210 or the second electrode 220 so as to allow impulsive movement of one electrode with respect to the other.

The voltage power source may naturally be connected to both the first electrode 210 and the second electrode 220, thereby allowing generation of an electric field as a source to said impulsive forces for de-icing FIG. 3a schematically illustrates a wing of an aircraft being provided with a plurality of de-icing arrangements, according to an aspect of the present invention;

There is shown a wing 370 of an aircraft 100. The wing 370 is provided with seven slats, namely a first slat 310, a second slat 320, a third slat 330, a fourth slat 340, a fifth slat 350, a sixth slat 360 and a seventh slat 365, separated, distributed and controlled in a conventional manner.

According to an aspect of the invention at least one de-icing arrangement is provided for at least one of the slats 310-365. According to one example one electrode configuration 200 is integrated in each of said seven slats 310-365. The voltage power source 250 is arranged to be controlled by the control unit 500 according to what is depicted with reference to FIG. 2. According to this example, the voltage power source 250 is arranged to power an electrode configuration 200 located in each of said seven slats 310-365.

According to this example the control unit 500 is arranged for communication with a detection/measuring system 280 in each of said slats 310-365 of said wing 370 via a communication link L300.

Each slat may be de-iced mutually independent according to an aspect of the invention.

Figure 3B:
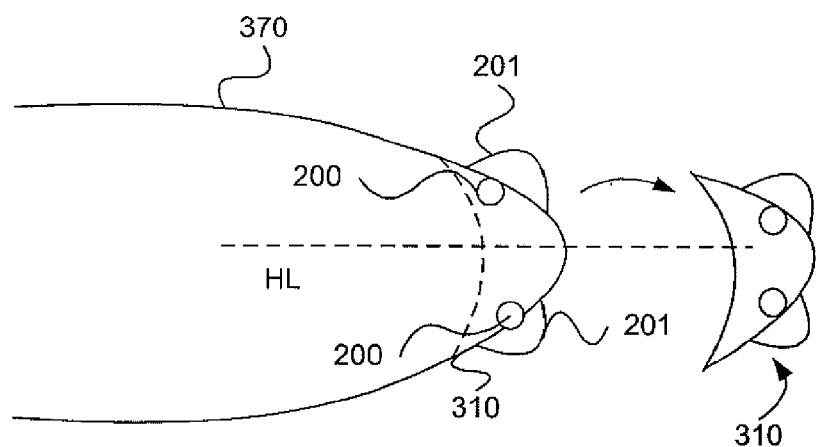
FIG. 3b schematically illustrates a cross sectional view of a wing of an aircraft being provided with a pair of de-icing arrangements, according to an aspect of the present invention.

FIG. 3b schematically illustrates a cross sectional view of a wing of an aircraft being provided with a pair of the electrode configurations 200, according to an aspect of the present invention. A dotted head line is indicated by the letter HL.

The electrode configurations 200 may be arranged in each slat 310-365 in this advantageous manner. Ice 201 is built up on the wing 370 approximately as shown in FIG. 3 b. Thus, by arranging two electrode configurations where ice is known to be built up during flight with the aircraft 100 an effective means for rejecting said ice is provided.

Under certain conditions, say in the absence of slats or in the case of wind mill propeller blades, one of the electrodes of the electrode configuration (the fixed one) could be dimensioned to be able to carry current intensities occurring in lightning conditions, whereby it can be used as a lightning diverter conductor assuming the other electrode protected for induced transients backwards to electronics.

It should be noted that said electrode configurations may be installed in any of slats 310-365 of aircraft 100, and may also be used in a rest position as well as in a protruded position, as schematically indicated in FIG. 3 b. Power lines for supplying a voltage to the electrode arrangement 200 may be operating in both the rest position and the protruded position.

As it can be realized, the very small thicknesses of all the components (first electrode 210, second electrode 220 and dielectric element 230) involved in the concept make it of very low intrusion level, low weight and volume.

The total cost of the concept is rather low in terms of material and components. The total architecture of a technical solution with it could comprise a microprocessor based core and a sensor encompassing the possibility of alarms, activations, events register data base, etc.

It should be noticed that with the suggested dimensions the total weight addition to the whole composite nose profile of a wing will not be significant at all.

Figure 4A:
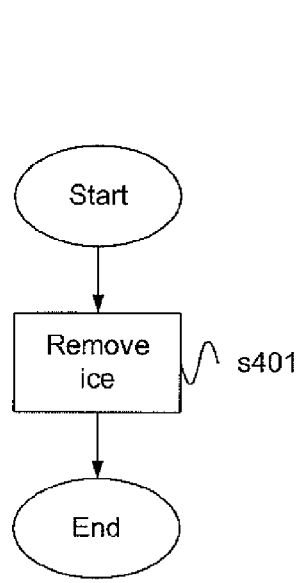
FIG. 4a schematically illustrates a method for de-icing a structural element, according to an aspect of the present invention.

With reference to FIG. 4a there is illustrated a method for de-icing a structural element, according to an aspect of the invention. The method comprises a first step 401. The method step s401 comprises the step of, when applicable, electrically charging an electrode configuration by means of a power source, which is electrically connected to said electrode configuration. The method step s401 also comprises the step of: generating an impulsive force for removal of ice adhered on said structural element. After the method step s401 the method ends.

Figure 4B:
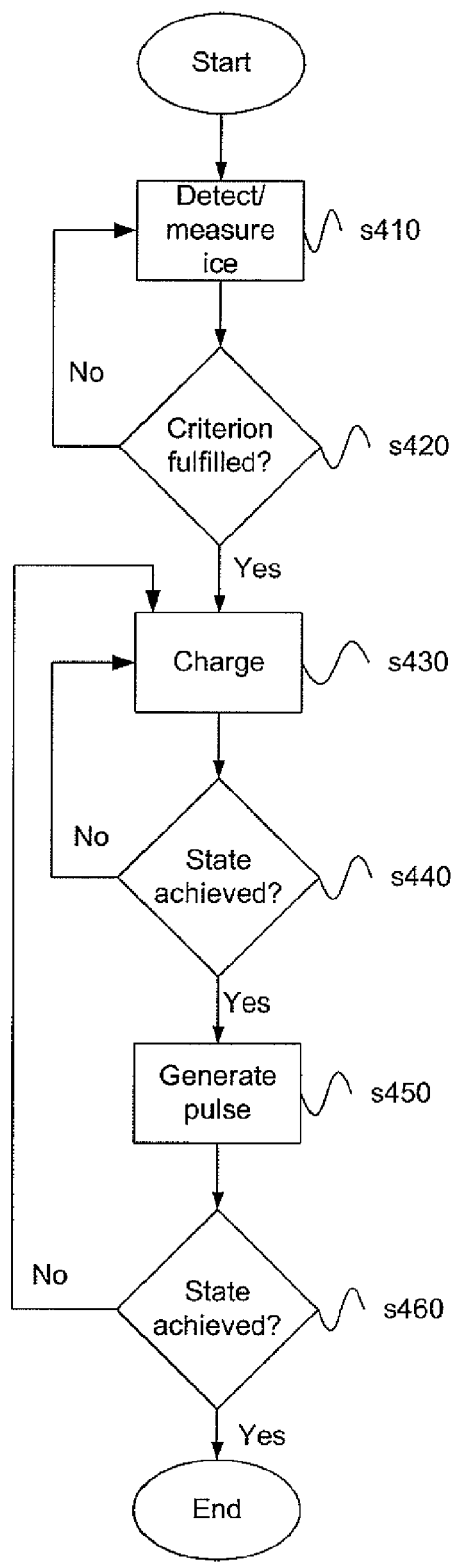
FIG. 4b schematically illustrates a method for de-icing a structural element, depicted in greater detail, according to an aspect of the present invention.

With reference to FIG. 4b there is illustrated a flowchart of the inventive de-icing method depicted in greater detail, according to an aspect of the invention.

The method comprises a first method step s410. In the method step s410 there is detected if a structural element is at least partly covered with adhered ice. This may be performed in various ways, e.g. by means of the detecting/measuring system 280. In the method step s410 there is also measured a thickness of the detected ice. The thickness may be an average thickness, or a minimum or maximum thickness of said ice. The thickness of the detected ice may be a thickness associated with a predetermined area of said structural element. After the method step s410 a subsequent method step s420 is performed.

The method step s420 comprises the step of determining if a predetermined ice criterion is fulfilled. The predetermined ice criterion may be fulfilled if the detected ice has a thickness that exceeds a predetermined thickness, e.g. 1 mm. The predetermined ice criterion may be fulfilled if the detected ice has a thickness which falls within a predetermined ice thickness interval, e.g. 1-3 mm. Any suitable ice thickness interval may be used to determine whether the predetermined ice criterion is fulfilled.

The predetermined ice criterion may not be fulfilled if the detected ice has a thickness that is lower than a predetermined ice thickness value, e.g. 1 mm. The predetermined ice criterion may not be fulfilled if the detected ice has a thickness that is larger than a predetermined ice thickness value, e.g. 3 mm.

If the predetermined ice criterion is fulfilled (Yes), a subsequent method step s430 is performed. If the predetermined ice criterion is not fulfilled (No), the method step s410 is performed again.

The method step s430 comprises the step of charging the electrode configuration 200 to a predetermined electric state. This electric state may be defined by an electric field E and a voltage V between the first electrode 210 and the second electrode 220 of said electrode configuration 200. Said electric state involves a stored electrical energy which, when transformed to an impulsive force, is large enough to remove at least a part of said adhered ice on said structural element. Basically, it is the sudden change in the energy stored in the electrodes arrangement that will lead to a force which is normal (perpendicular) to the surface of the electrodes and therefore, if one is fixed, the other will be repelled. A variation in the stored energy will be proportional to a variation of the separation of the electrodes times a force. After the method step s430 a subsequent method step s440 is performed.

The method step s440 comprises the step of determining if the predetermined electric state is achieved. If the predetermined electric state has been achieved (Yes) due the charging of said electrode configuration 200 a subsequent method step s450 is performed. If the predetermined electric state has not yet been achieved (No), the method step s430 is performed again (charging continues).

The method step s450 comprises the step of generating an impulsive force Fn, based upon said charging and a discharging of said electrode configuration 200. Thus, charging and discharging to and from said electric state is performed in a controlled way, for successful removal of at least a part of said ice adhered on said structural member. Preferably all adhered ice on said structural element. After the method step s450 a subsequent method step s460 is performed.

The method step s460 comprises the step of determining if the ice adhered to the structural element has been removed to a desired extent. This step may also be performed by means of said detection/measure system 280. If the ice adhered to the structural element has been removed to a desired extent (Yes), the method ends. If the ice adhered to the structural element has not been removed to a desired extent (No), the method step s430 is performed again.

Figure 5:
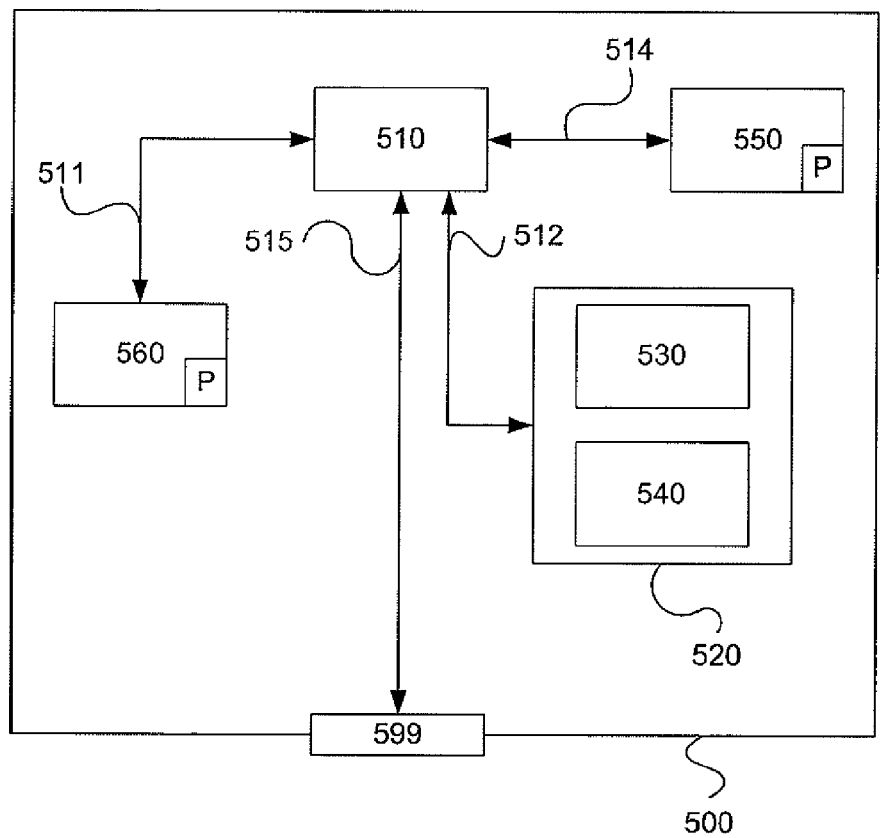
FIG. 5 schematically illustrates a control unit, according to an aspect of the present invention.

With reference to FIG. 5, a diagram of one embodiment of the electronic data processing unit 500 is shown. The data processing unit 500 is also illustrated with reference to FIGS. 2 and 3a. The electronic data processing unit 500 is also referred to as control unit 500. The control unit 500 may be a de-icing control unit aboard an aircraft 100. The control unit 500 may be a de-icing control unit of a wind power installation 110. The control unit 500 comprises a non-volatile memory 520, a data processing device 510 and a read/write memory 550. Non-volatile memory 520 has a first memory portion 530 wherein a computer program, such as an operating system, is stored for controlling the function of the control unit. Further, the control unit 500 comprises a bus controller, a serial communication port, I/O-means, an ND-converter, a time date entry and transmission unit, an event counter and an interrupt controller (not shown). Non-volatile memory 520 also has a second memory portion 540.

The control unit 500 may be arranged for communication with a main mission computer of an aircraft or a central monitoring system computer of e.g. a wind power installation.

A computer program P comprising routines for de-icing a structural element, may be stored in an executable manner or in a compressed state in a separate memory 560 and/or in read/write memory 550. The memory 560 is a non-volatile memory, such as a flash memory, an EPROM, an EEPROM or a ROM. The memory 560 is a computer program product. The memory 550 is a computer program product.

When it is stated that the data processing device 510 performs a certain function it should be understood that the data processing device 510 performs a certain part of the program which is stored in the separate memory 560, or a certain part of the program which is stored in the read/write memory 550.

The data processing device 510 may communicate with a data communications port 599 by means of a data bus 515. The non-volatile memory 520 is adapted for communication with the data processing device 510 via a data bus 512. The separate memory 560 is adapted for communication with the data processing device 510 via a data bus 511. The read/write memory 550 is adapted for communication with the data processing device 510 via a data bus 514.

Signals may received from the detection/measuring system 280 and be stored in the memory 550 or 560.

When data, such as ice detection/ice thickness data, is received on the data port 599 from the detection/measuring system 280 it is temporarily stored in the second memory portion 540. When the received input data has been temporarily stored, the data processing device 510 is set up to perform execution of code in a manner described herein. The processing device 510 is arranged to perform routines so as to de-ice the structural element according to an aspect of the invention.

Parts of the methods described herein can be performed by the apparatus by means of the data processing device 510 running the program stored in the separate memory 560 or the read/write memory 550. When the apparatus runs the program, parts of the methods described herein are executed.

An aspect of the invention relates to a computer programme P comprising a programme code for de-icing a structural element, such as an aircraft wing, comprising the step of:

when applicable, electrically charging an electrode configuration by means of a power source which is electrically connected to said electrode configuration, and the step of:

generating an impulsive force for removal of ice adhered on said structural element, when said computer programme is run on a computer.

An aspect of the invention relates to a computer programme product comprising a program code stored on a, by a computer readable, media for de-icing a structural element, comprising the steps of:

when applicable, electrically charging an electrode configuration by means of a power source which is electrically connected to said electrode configuration, and the step of:

generating an impulsive force for removal of ice adhered on said structural member, when said computer programme is run on a computer.

The invention relies on the following basic principle of electrodynamics:

Let us consider a plane parallel capacitor configuration, where the capacitance can be expressed as follows:

$$C = \frac{2W}{V^2} = \frac{\varepsilon_0 A}{h}$$

Where W is the energy stored in the field of the capacitor, V is the voltage across the plates (electrodes), and A is the area of the electrodes while h is the distance of the separation gap between the electrodes.

Since the energy stored in the field can be expressed as force times a displacement, the following can be derived:

$$dW = \frac{1}{2}V^2 dC = \frac{1}{2}V^2 d\left(\frac{\varepsilon_0 A}{h}\right) = -F_n dn$$

Where the last term represent the work done on the system. This in turn can be expressed as follows $$dW = -\frac{1}{2}V^2 \frac{\varepsilon_0 A}{h^2} dh = -F_n dn$$

Where the differential has been evaluated at h=h, the initial separation of the electrodes. It is therefore evident that $$F_n = \frac{1}{2}V^2 \frac{\varepsilon_0 A}{h^2}$$

Which means that a force perpendicular to the surface of the electrodes in the normal direction will be present being proportional to the square of the applied voltage and inversely proportional to the gap of the electrodes for a given area A of the electrodes. Furthermore, the force Fn is independent of the electrodes materials properties. The gap h between the electrodes has been considered as an air gap for sake of simplicity.

However, if the gap is to be filled with some dielectric medium, the relative dielectric constant of the medium should be added as a multiplying factor. If the gap is filled with a dielectric material, it could be thin enough to avoid electrical breakdown, especially at field enhancement points at electrodes borders. Furthermore, this can be very much needed to avoid flexural deformation of the skin of the wings as due to pressure at the aerodynamic flying conditions.

The displacement is the interesting parameter in this case since, assuming an impulsive voltage, it will result in impulsive force that in turn will induce membrane oscillations modes in the skin needed to obtain ice rejection through the mechanical action on it. It should be noticed that the sign of the voltage will not change the rejection character of the acting force.

Let us assume, for the sake of exemplification in the last equation a fix area of $0.40 \times 0.60$ m=0.24 m$^2$ and a separation of the electrodes of 0.001 m. The following forces will be acting upon the electrodes of the capacitor as a function of voltage levels:

| Voltage (Volts) | Force (Newtons) A1 | Force (Newtons) A2 |
|---|---|---|
| 2 000 | 4.25 | 0.27 |
| 3 000 | 9.56 | 0.60 |
| 4 000 | 17.0 | 1.06 |
| 5 000 | 26.56 | 1.66 |
| 6 000 | 38.25 | 2.39 |
| 7 000 | 52.06 | 3.25 |
| 8 000 | 68.06 | 4.25 |
| 9 000 | 86.06 | 5.38 |
| 10 000 | 106.25 | 6.64 |

Where:
A1: $0.40 \times 0.60 = 0.24$ m$^2$; and
A2: $0.04 \times 0.60 = 0.02$ m$^2$ Which show that the forces attainable with this system are better or comparable to the order of magnitude of those found in the prior art actuators (electromagnetic coil actuators).

The first Force column had been calculated for an area of 0.24 m$^2$ while the second is for an area of 0.02 m$^2$ ($0.04 \times 0.60$ m) both at the same thickness of 0.001 m. The resulting maximum impulsive force density ranges from about 450 N/m$^2$ to 350 N/m$^2$ in the second column.

Force densities in these ranges are expected to be enough to accomplish ice rejection from surfaces (skin) of wings of aircrafts. Force densities in these ranges are expected to be enough to accomplish ice rejection from surfaces (skin) of propeller blades of wind power installations.

In any case, it can be foresee that the total weight/volume ratio of the whole concept is definitely highly suitable for the suggested integration in both aircrafts and wind power installations.

It should be realized that a movable skin can be designed with a pattern of strip electrodes while the fix, non movable electrode could be as wide as needed. The activation of different electrodes at different times via electronic means where the unit 250 even comprise a addressable multiplexer who could activate different movable electrodes on the skin at different time intervals whereby a variety of oscillations patterns can be accomplished, i.e., surface deformations of the skin such that ice rejection can effectively be accomplished. The basic physical principle on which this ice accretion detection and thickness measurements of accreted ice is founded is basically related to the temperature dependence of the dielectric property tensor of water and ice. The real part of the dielectric constant has shown a linear behavior on temperature. Furthermore, at the liquid to solid state phase transition point, i.e., at 0° C., the dielectric constant exhibit a discontinuity that could be used to detect the inception of ice formation, however the chosen differential setup of the measuring lock-in amplifier based method will not focus on just this feature. Accreted ice thickness however correlates very well to the linear behavior of the dielectric properties on temperature.

Measurements and sensors should comply with a number of restrictions to be applicable to constrains in the aeronautic environment. First, it must be such that the sensor does not introduce any perturbation to the aerodynamic demands of laminar flow at the wings and fuselage skin where sensors might be needed.

Measurements needs to be performed in a rather fast manner as to accomplish a reliable signal for process control, for instance the secure activation of ice rejection devices as soon as the accumulated ice exceeds a preselected thickness threshold value. Furthermore, noise rejection is mandatory in such environments where spurious signals can jeopardize the measuring process, therefore high quality of the measuring method is mandatory.

Furthermore, the whole system can be adapted to many other applications, aeronautical or not. A sensor of the detection/measuring system is such that it can even be made compatible with for instance icephobic coatings or other paintings providing that they are not affecting the guard or short-circuiting the electrodes. Mobile or stationary applications are also fully compatible. Furthermore, a whole miniaturization of the electronic and sensor system is fully achievable and therefore complex applications like in each asp of a wind-turbine could be considered.

However, it should be mentioned that differential measurements with a reference encased in a canister or otherwise kept at constant conditions could lead to the detection of spurious signals in some applications since the sensor would be able to detect reactive responses of whatever is in the surrounding. Such could be the rotor blade of an aircraft if the sensor is installed just behind the area of the rotor. In such a case the signal detected would be modulated by each blade of the propeller. Although such effects could be filtered electronically, provisions have to be taken due to the very high sensitivity of the sensor devices, spurious reactive signals could be generated by any object that changes position or shape. This will not be the case in aircraft for instance but could be a situation in other applications with variable environmental where more massive objects are involved.

A possible design for integration in a composite structure aimed to offer highly laminar flow smoothness of the surface while still integrated a de-icing solution as the one here by suggested could, as an example, comprise the following:
1. A basic electrode made of a metallic sheet connected to power wire, otherwise electrically isolated in the matrix of polymeric structure of the structure element. Contacts and wiring must be done quite carefully paying particular attention to all field enhancement effects at borders, corners, sharp edges, etc.
2. An insulating layer of the highest electric breakdown performance, for instance Polyesters like Mylar, PTFE Teflon or alike (Typical values are 250 μm thick, 15 kV breakdown level, $\in_r$~3.2, etc).
3. A thin electrode, eventually the highly anisotropic conductivity of carbon fiber reinforced whole polymeric construction elements could serve as electrode providing it exhibit an electrical conductivity that is suitable to have it regarded as ground level connected to the rest of the aircraft.
4. The suggested geometrical dimensions of the electrodes at each slat of aircraft 100 could be of the order of ≤40 mm×length (say 40-60 cm long). The material could be stainless steel, aluminum or any other metallic compatible foil of a thickness of less than 0.5 mm (Cu or Al may act as catalytic agent for the onset of oxidative process in the epoxy bulk).

The structural element comprising the electrode configuration should be carefully analyzed with respect to long term materials compatibility in view of the particular application (aircraft, wind power installation or any other)

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. De-icing arrangement for de-icing a structural element, said arrangement comprising:
    an ice-detecting element configured to detect a current ice state of said structural element wherein the current ice state is determined based at least in part on a measured ice thickness;
    a power source being electrically connected to an electrode configuration, said electrode configuration comprising a first electrode and a second electrode, wherein the first and second electrode collectively define a plate capacitor, said power source being electrically connected to the electrode configuration; and
    a control unit connected to said power source and the ice-detecting element, wherein:
    the control unit is configured to, based upon said detected current ice state, determine whether said current ice state fulfills a predetermined ice criterion, wherein the current ice state is determined based at least in part on the measured ice thickness and the measured ice thickness is in the range of 1-10 millimeters;
    the control unit is configured to, based upon said current ice state fulfilling said predetermined ice criterion, electrically charge, via the power source, said electrode configuration to a predetermined state such that an electrical field is established between the first electrode and the second electrode, said predetermined state and said electrical field generated corresponding to said current ice state detected and that fulfills said predetermined ice criterion, wherein said predetermined state and said electrical field vary according to the measured ice thickness;
    said electrode configuration is positioned adjacent said structural element such that an impulsive force generated by an applied voltage punctures ice adhered on said structural element in a direction substantially normal to said structural element;
    said impulsive force is generated during charging to and discharging from said predetermined state;
    during said discharging said impulsive force is caused at least in part by said electrical field; and
    said impulsive force has an amplitude corresponding to said current ice state, such that said generated impulsive force punctures and removes ice adhered on said structural element.

2. De-icing arrangement according to claim 1, wherein said first electrode and said second electrode are mutually displaceable.

3. De-icing arrangement according to claim 2, wherein one of said first and second electrode being closest to the ice to be removed.

4. De-icing arrangement according to claim 3, wherein the other one of said first and second electrode being fixed to said structural element.

5. De-icing arrangement according to claim 1, wherein said electrode configuration comprises the first electrode and the second electrode being provided in a close proximity of each other.

6. De-icing arrangement according to claim 1, wherein said electrode configuration comprises a sandwiched dielectric element.

7. De-icing arrangement according to claim 1, wherein said first and second electrodes are strip like.

8. De-icing arrangement according to claim 1, wherein:
said first electrode comprises a plurality of separated first electrodes; and
said second electrode is functionally provided at each of said plurality of separated first electrodes.

9. De-icing arrangement according to claim 1, wherein said generated impulsive force has an amplitude such that said generated impulsive force punctures and removes an adhered layer of ice having a thickness of about 1-3 millimeter.

10. De-icing arrangement according to claim 1, wherein said arrangement is made of material sufficient to withstand a number of successive impulsive forces for removal of ice adhered on said structural element, said number of successive impulsive forces generated by the applied voltage.

11. De-icing arrangement according to claim 1, comprising at least two electrode configurations.

12. De-icing arrangement according to claim 1, wherein said structural element is made of a non-metallic material comprising at least one of carbon-fibre or glass-fibre.

13. Platform comprising the de-icing arrangement according to claim 1.

14. Platform according to claim 13, wherein the platform is an aircraft and said structural element is an aircraft wing or aircraft rudder.

15. Method for de-icing a structural element, said method comprising the step of:
detecting a current ice state of said structural element, wherein the current ice state is determined based at least in part on a measured ice thickness;
determining, via a control unit, whether said current ice state fulfills a predetermined ice criterion, wherein the current ice state is determined based at least in part on the measured ice thickness and the measured ice thickness is in the range of 1-10 millimeters;
based upon said current ice state fulfilling said predetermined ice criterion, electrically charging, via a power source electrically connected to an electrode configuration and controlled by said control unit, the electrode configuration to a predetermined state such that an electrical field is established between a first electrode and a second electrode, said predetermined state corresponding to said current ice state detected that fulfills said predetermined ice criterion, wherein said predetermined state and said electrical field vary according to the measured ice thickness; and
discharging said electrode configuration from said predetermined state, wherein:
an impulsive force is generated during charging to and discharging from said predetermined state;
during said discharging of said electrode configuration, said impulsive force is generated at least in part by said electrical field;
said impulsive force has an amplitude corresponding to said current ice state, such that said generated impulsive force punctures and removes ice adhered on said structural element; and
said first and second electrode of said electrode configuration collectively define a plate capacitor.

16. Method according to claim 15, further comprising the step of activating said electrically charging of said electrode configuration on the basis of a signal indicating presence of a current ice state on said structural element.

17. Method according to claim 15, further comprising the step of determining whether said electrically charging of said electrode configuration has set said electrode configuration in a predetermined state.

18. Method according to claim 15, further comprising the step of determining a state of ice built up on said structural element, and generating said impulsive force on the basis on said determined state.

19. De-icing arrangement according to claim 1, wherein said control unit comprises a data processing device.

* * * * *